(12) United States Patent
Mills et al.

(10) Patent No.: US 11,053,007 B1
(45) Date of Patent: Jul. 6, 2021

(54) DEVICE FOR DISPENSING PYROPHORIC PARTICULATE MATERIALS

(71) Applicant: U.S. Government as Represented by the Secretary of the Army, Dover, NJ (US)

(72) Inventors: Kendall Mills, Blairstown, NJ (US); Clinton Plaza, Easton, PA (US); Juan Patino, West Milford, NJ (US); Lauren Morris, Midland Park, NJ (US); Zhaohua Luan, Ledgewood, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/729,664

(22) Filed: Dec. 30, 2019

(51) Int. Cl.
B64D 1/08 (2006.01)
F41H 11/02 (2006.01)
B64D 1/16 (2006.01)

(52) U.S. Cl.
CPC ............... B64D 1/08 (2013.01); B64D 1/16 (2013.01); F41H 11/02 (2013.01)

(58) Field of Classification Search
CPC . F42B 5/15; F42B 12/46; F42B 12/70; B64D 1/08; B64D 1/16
USPC .......................................... 89/1.51; 102/505
See application file for complete search history.

(56) References Cited

U.S. PATENT DOCUMENTS

| | | | | |
|---|---|---|---|---|
| 3,741,125 A | * | 6/1973 | La Pointe | F42B 12/70 102/377 |
| 4,299,166 A | * | 11/1981 | Carignan | F42B 12/70 102/293 |
| 5,182,078 A | * | 1/1993 | Baldi | C06B 21/0083 414/9 |
| 5,631,441 A | * | 5/1997 | Briere | F42B 5/15 102/336 |
| 6,055,909 A | * | 5/2000 | Sweeny | F41J 2/02 102/336 |
| 6,193,814 B1 | * | 2/2001 | Baldi | B22F 7/004 148/240 |
| 6,666,351 B1 | * | 12/2003 | Hartz | B64D 1/02 102/342 |
| 7,516,700 B1 | * | 4/2009 | Callaway | F42B 4/26 102/334 |
| 9,851,183 B2 | | 12/2017 | Melin | |
| 10,059,637 B2 | | 8/2018 | Luan | |
| 2007/0039505 A1 | * | 2/2007 | Dillard | F41J 2/02 102/336 |
| 2019/0339049 A1 | * | 11/2019 | Rastegar | F42B 5/15 |

FOREIGN PATENT DOCUMENTS

EP 246368 B1 4/1991

\* cited by examiner

Primary Examiner — Bret Hayes
(74) Attorney, Agent, or Firm — John P. DiScala

(57) ABSTRACT

The present invention is directed to a device for dispensing pyrophoric decoy particulates where the device is comprised of at least one payload vessel having a structural wall that forms a cavity for housing a plurality of pyrophoric particles. The structural wall has at least one opening to facilitate dispersal of the pyrophoric particles. The payload vessels are inserted inside a tubular sleeve and hermetically sealed inside the sleeve. Within the sleeve the at least one payload vessel is also in direct contact with an expulsion assembly that upon activation pushes the payload vessels and its pyrophoric contents out of the sleeve to react with the air.

6 Claims, 3 Drawing Sheets

DEVICE FOR DISPENSING PYROPHORIC PARTICULATE MATERIALS

RIGHTS OF THE GOVERNMENT

The inventions described herein may be manufactured and used by or for the United States Government for government purposes without payment of any royalties.

FIELD OF INVENTION

The present invention relates generally to decoy dispensers and more specifically to dispensers for fragile pyrophoric particles.

BACKGROUND OF THE INVENTION

Pyrophoric decoys that create an infrared signature are deployed as countermeasures against heat seeking missiles. Current state of the art pyrophoric decoys are generally composed of pyrophoric materials embedded into sheets which are cut into coupons. The coupons are loaded into explosive canisters and ejected like confetti when the decoy is deployed. These pyrophoric coupons must be mechanically robust to withstand shock and compression forces when the coupons are explosively ejected from its casing.

In contrast to the robust coupons, pyrophoric decoys can also be made of more fragile particulate material. U.S. Pat. No. 10,059,637 issued to Luan et. Al. and U.S. Patent application titled, "Process for Preparing Pyrophoric Foam Particles" describe methods for preparing pyrophoric foam particles that cannot be handled the same way as the current state of the art pyrophoric coupons. These pyrophoric particles are frangible and tend to become broken or crushed using standard pyrophoric decoy dispensers.

Thus, a need exists for an improved pyrophoric decoy dispenser design that can protect the fragile pyrophoric foam particles during loading and dispensing of such materials from the dispensers.

SUMMARY OF THE INVENTION

It is an objective of the invention to provide a decoy dispensing device that is capable of dispensing fragile pyrophoric decoy particles. The dispensing device comprises a least one payload vessel having a structural wall that forms a cavity to contain a plurality of pyrophoric particles. Such pyrophoric particulate material may include loose fragile granules or spheres that oxidizes upon contact with air to produce an infrared signature. The structural wall has at least one opening to facilitate dispersal of the pyrophoric particulate material. The at least one payload vessel is hermetically sealed inside a sleeve. Connected to the at least one payload vessel inside the sleeve is an expulsion assembly which consists of a piston and impulse cartridge.

BRIEF DESCRIPTION OF THE DRAWINGS

Further features and advantages of the present invention may be understood from the drawings.

DETAILED DESCRIPTION

Figure 1:
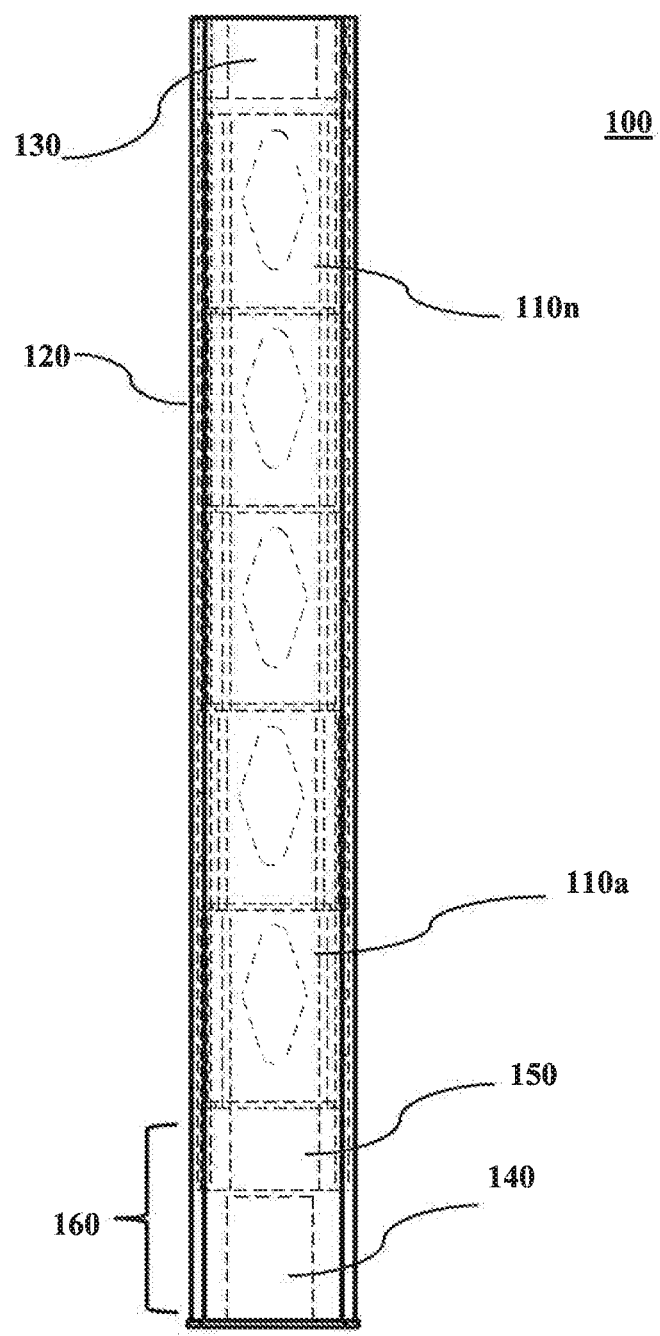
FIG. 1. Illustration of an exemplary pyrophoric decoy dispenser.

The present disclosure is directed to pyrophoric decoy dispensers comprising at least one payload vessel and an outer sleeve. FIG. 1 illustrates an exemplary pyrophoric decoy dispenser 100 having a plurality of payload vessels 110a . . . 110n, an outer sleeve 120, impulse cartridge 140 (housing an explosive charge), piston 150, and a pop-off endcap 130. The payload vessels are stacked in vertical alignment inside the sleeve 120. The uppermost payload vessel is hermetically sealed inside the sleeve with a pop-off end-cap 130. On the end opposite to the end-cap is an expulsion assembly 160 which is comprised of a piston 150 and an impulse cartridge 140.

The payload vessels (110a . . . 110n) can be made of polymers such as polycarbonate, ABS, PLA etc. or cardboard, metal and composites, however, such material must have sufficient structurally strength and integrity to transfer the compressive forces generated by the expulsion assembly 160 to the pop-off end-cap in order to push the end cap 130 off without crushing the fragile pyrophoric particles stored inside the vessels during deployment.

Figure 2:
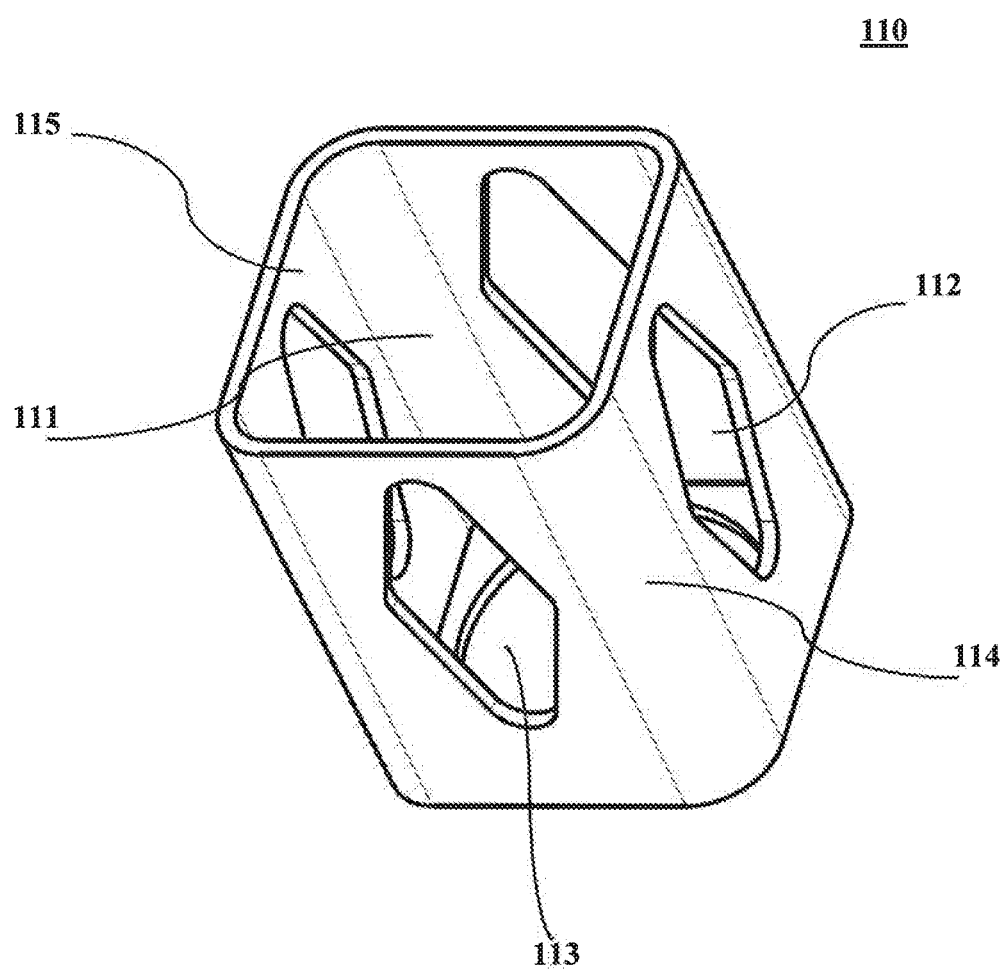
FIG. 2. Illustration of an exemplary payload vessel.

FIG. 2 illustrates an exemplary payload vessel having a cavity 111 to receive pyrophoric particles, a plurality of openings 112 along the vessel wall to facilitate dispersion of the particles when the vessels are deployed, and a base 113. The base 113 can optionally be fully, sealed or have an opening (shown in FIG. 2) to facilitate loading and dispersion of the pyrophoric particles when deployed. If an opening in the base is introduced (particularly for the vessel in direct contact with the expulsion assembly) it should be designed to prevent the piston from crushing the particles inside the vessel. Such design features could be to introduce a hole smaller than the diameter of the piston or to introduce structural features allowing the piston to contact the structural features when deployed and not the particulates. It is further recommended that the payload vessels have load bearing walls 114 to allow stacking of the vessels in vertical alignment along the longitudinal axis of the sleeve to divert the compression load away from the pyrophoric particulates inside the vessel. At least one opening 112 may be introduced on the load bearing wall to allow the particles to disperse from the vessels upon deployment of the device. A top opening 115 located opposite the base 113 is useful to facilitate loading of the pyrophoric material into the vessels.

The vessel must also be temperature stable and with sufficient strength to support rough handling. The dimension of the vessels must provide a sliding fit to the interior dimensions of the sleeve without rattling or binding. Although the drawings depicted here are directed to a square configuration, several types of vessel shapes may be used including round and rectangular cross sections that are appropriate for the mating sleeve. It is contemplated that at least one vessel may be used for each pyrophoric decoy dispensing device, however, a plurality of vessels may also be used. The length of each vessel is an integer fraction of the interior cavity length with sufficient spacing to accommodate the sleeve, cap and expulsion assembly. For example, if the interior cavity length is 5 inches and 5 vessels are used then each one should be 1 inch minus any appropriate tolerances required to prevent binding. Wall thicknesses of the vessels need only be thick enough to hold and protect the pyrophoric foam material from being crushed during expulsion. The thickness of the walls can vary so long as it meets the requirements set forth above and the strength of the materials used.

The pyrophoric particles useful with the decoy device are loose, frangible particles that may be in the form of spheres, granules and filaments or the like. Exemplary material may be the pyrophoric foam material disclosed in U.S. Pat. No. 10,059,637 and co-pending application, titled "Process for Preparing Pyrophoric Foam Particulates" the disclosures of which are incorporated herein in its entirety.

Figure 3:
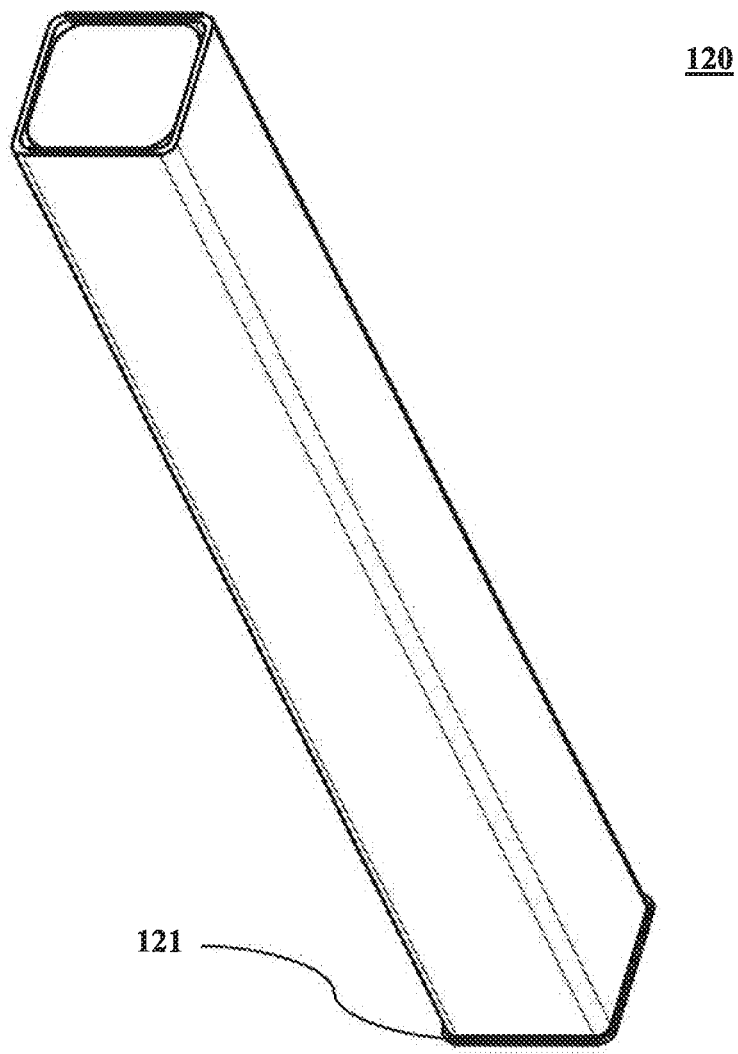
FIG. 3. Illustration of an exemplary outer sleeve to house the payload vessel.

FIG. 3 is an exemplary outer sleeve 120 to cover and house the vessel(s). It may be made of any material that can protect the vessels during handling, storage, and deployment. The sleeve can be cylindrical, square or rectangular shape tube. On the top end of the sleeve is an opening for insertion of the payload vessel and on the other end is the base 121 that may contain a slot for receiving the impulse cartridge. When assembled with the impulse cartridge, the base of the sleeve is generally sealed so that when the pop-off end cap is placed over the uppermost vessel, the contents within the sleeve are hermetically sealed. Suggested materials for the sleeve include metal or polymers with metal being preferred.

Referring now to FIG. 1, the dispensing device 100 is initiated when an explosive charge 140 is activated creating expanding gases that forcibly pushes the piston 150 in close association with the explosive charge away from the charge. The piston 150 in turn forcibly expels the vessels 110*n* containing the pyrophoric particles (not shown) out of the sleeve 120. As the vessels exit the sleeve, the pyrophoric material is released from the vessels openings 115 and 112 and optionally from 113 (if present) to react with the atmosphere.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description but by the claims and any equivalents.

What is claimed is:

1. A device for dispensing pyrophoric decoy particulate comprising:

a. a plurality of payload vessels, wherein each of the plurality of payload vessels is comprised of a structural wall forming a cavity, at least one opening on the structural wall, wherein the cavity comprises a plurality of pyrophoric particles;

b. an expulsion assembly in contact with one payload vessel of the plurality of payload vessels and further comprising a piston and an impulse cartridge;

c. a tubular sleeve surrounding the plurality of payload vessels and expulsion assembly; and d. wherein the pyrophoric particles are hermetically sealed inside the sleeve with an end-cap and an ejection impulse of the expulsion assembly is transmitted through the plurality of payload vessels to pop-off the end-cap without compressing the plurality of pyrophoric particles.

2. The device of claim 1, wherein the pyrophoric particles are comprised of pyrophoric foam.

3. The device of claim 1, wherein the pyrophoric particles are loose granules or spheres.

4. The device of claim 1, wherein the plurality of payload vessels are comprised of cardboard, plastic or metal.

5. The device of claim 1, wherein the plurality of payload vessels are less than 6.

6. The device of claim 1, wherein the structural wall is comprised of greater than 2 and less than 5 openings.

* * * * *